United States Patent [19]

Arakawa et al.

[11] Patent Number: 5,452,228
[45] Date of Patent: Sep. 19, 1995

[54] PATH DELAY ALLOCATION METHOD IN THE PHYSICAL HIERARCHY

[75] Inventors: Kouichi Arakawa; Yasushi Ogawa, both of Kokubunji, Japan

[73] Assignee: Hitachi, Ltd., Tokyo, Japan

[21] Appl. No.: 980,397

[22] Filed: Nov. 23, 1992

[30] Foreign Application Priority Data

Nov. 28, 1991 [JP] Japan .................................. 3-314301

[51] Int. Cl.$^6$ ............................................. G06F 17/50
[52] U.S. Cl. ...................................... 364/489; 364/488
[58] Field of Search ................. 364/490, 489, 488, 578

[56] References Cited

U.S. PATENT DOCUMENTS

| | | | |
|---|---|---|---|
| 5,010,493 | 4/1991 | Matsumoto et al. | 364/490 |
| 5,062,067 | 10/1991 | Schaefer et al. | 364/578 |
| 5,068,812 | 11/1991 | Schaefer et al. | 364/578 |
| 5,077,676 | 12/1991 | Johnson et al. | 364/489 |
| 5,109,168 | 4/1992 | Rusu | 364/490 |
| 5,235,521 | 8/1993 | Johnson et al. | 364/489 |

OTHER PUBLICATIONS

Nair, Ravi et al. "Generation of Performance Constraints for Layout," IEEE Transactions on Computer-Aided Design, vol. 8, No. 8, Aug. 1989, pp. 860–874. (in English).

*Primary Examiner*—Vincent N. Trans
*Attorney, Agent, or Firm*—Fay, Sharpe, Beall, Fagan, Minnich & McKee

[57] ABSTRACT

An electronic apparatus of hierarchical design includes a path extending between a plurality of hierarchy levels. Path delays at the upper hierarchy level are calculated beforehand, and path delay target times at subdivided paths of the path extending between the upper and lower hierarchy levels are determined by proportional distribution of the calculated path delay. The path delay target times can also be determined for an open path and a through path in the physical hierarchy, so that, when the path delay target time requirement is obeyed in the physical hierarchy, the path delays in the entire apparatus can be limited to less than their target times.

5 Claims, 7 Drawing Sheets

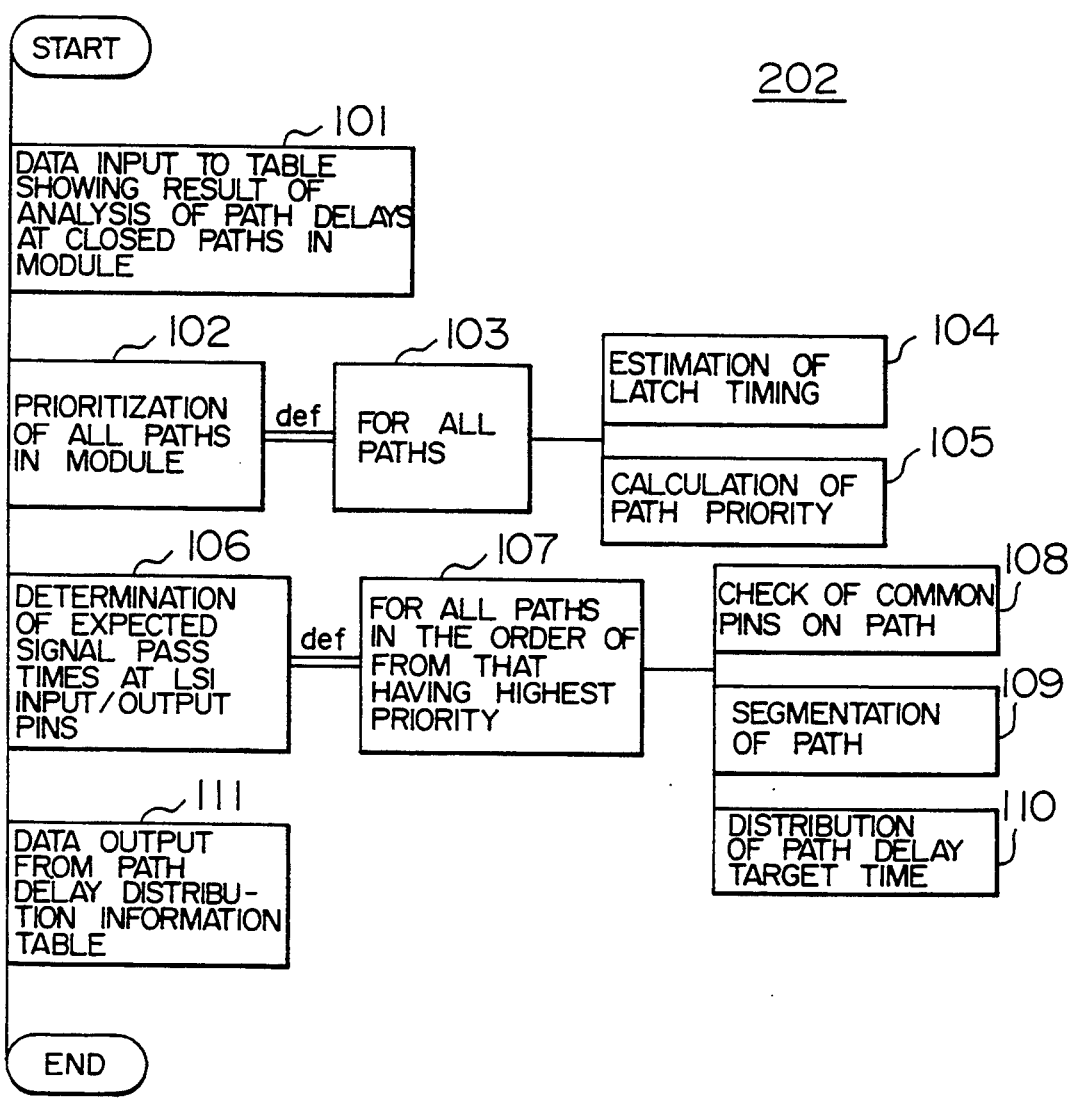
F I G. 1

FIG. 3

| STARTING FLIP-FLOP | END FLIP-FLOP | CLOCK PHASE OF STARTING FLIP-FLOP | CLOCK PHASE OF END FLIP-FLOP | PATH DELAY | ENTRY TO TABLE OF DETAILED PATH DELAYS | NUMBER OF LSI INPUT/OUTPUT PINS ON PATHS |
|---|---|---|---|---|---|---|
| | | | | | | |
| | | | | | | |

301  302  303  304  305  306  307

204a / 204

| LSI INPUT/OUTPUT PIN | PATH DELAY |
|---|---|
| | |
| | |
| | |

| INPUT/OUTPUT PIN | EXPECTED SIGNAL PASS TIME |
|---|---|
| | |
| | |
| | |

401  402

~205

PATH DELAY ALLOCATION METHOD IN THE PHYSICAL HIERARCHY

BACKGROUND OF THE INVENTION

This invention relates to a path delay allocation method applied to an electronic apparatus of physical hierarchical design so as to allocate path delay target times to paths extending between a plurality of levels in the physical hierarchy.

A layout of an electronic apparatus, such as, that including LSIs is frequently designed by calculating signal delay times beforehand on the basis of logic information and utilizing the result of calculation for placement and routing of the LSIs. For example, a method for attaining such a placement and routing procedure without path delay violation is described in IEEE Trans. on CAD, Vol. 8, 1989, pp. 860–874. According to this method, the concept called a slack representing the difference between the period of time required for a signal to reach a specific point from an input pin and the period of time required for the signal to reach an output pin from that point is used to provide the net with a slack for path delay and utilize this slack for the path delay so as to attain the placement and routing without any path delay violation. The proposed method is a design technique that can be applied to one level of physical hierarchy.

In a logic circuit, a signal route extending from a flip-flop to another flip-flop is called a path. The period of time required for a signal to propagate through this path is called a path delay. According to the timing of a clock signal applied to the starting flip-flop and the end flip-flop on each path, the maximum allowable value and the minimum allowable value of the path delay are determined. In the physical hierarchy, the path delay is required to satisfy these target values. This requirement is called the path delay requirement. This path delay requirement for the maximum allowable value will now be specifically described, by way of example.

In the case of physical design of an electronic apparatus, placement and routing of all of the components forming the apparatus must satisfy the path delay requirement described above.

However, with the increase in the scale of the electronic apparatus, it is necessary to divide the apparatus and constitute the physical hierarchy levels such as LSIs, modules and printed circuit boards. In the design of the apparatus too, the logic of the entire apparatus is first divided into a plurality of hierarchy levels to deal with the increase in the scale, and, in parallel with the division, hierarchical design of various components in each level is made. For example, a plurality of LSIs are mounted on a module. Placement and routing of these LSIs is frequently designed independently of and in parallel with each other.

Thus, in an electronic apparatus of hierarchical design, a path extending between a plurality of levels in the physical hierarchy exists necessarily. Such a path is part of one of the levels in the physical hierarchy. Although the path delay target time for the entire path was determined, the path delay target time for such a subdivided path was not yet determined.

Suppose that two LSIs are mounted on a module, and a path starting from within one of the LSIs passes through a route on the module to end at the other LSI. The placement and routing of these two LSIs was done hitherto independently of each other. Therefore, it was the prior art placement and routing procedure that a severe path delay target time which was, for example, ⅓ of the machine cycle was set for the subdivided paths in each LSI.

However, as a higher performance is more and more demanded for an electronic apparatus, it is difficult to obey such a severe target time requirement when the path delay requirement which is so severe as described above is uniformly imposed on the subdivided paths. Also, when such a severe path delay requirement is uniformly imposed on the subdivided paths, this severe requirement is wasteful when the number of gates belonging to the path is small, and there is a slack for path delay of the subdivided paths. That is, unless the path delay target time is set for each subdivided path, the desired effective physical hierarchy cannot be achieved.

SUMMARY OF THE INVENTION

It is an object of the present invention to provide a path delay allocation method in the physical hierarchy in which a path delay target time is set for each of subdivided paths in the hierarchy levels of an electronic apparatus of hierarchical design. In the method of the present invention, the hierarchical design of the electronic apparatus can be more effectively attained by suitably changing the priority of placement and routing of components according to the value of slack for the path delay target times of the subdivided paths.

The present invention which attains the above object provides a path delay allocation method in the physical hierarchy consisting of a first hierarchy level and a second hierarchy level mounting a plurality of components of the first hierarchy level, comprising the steps of: (1) calculating beforehand path delays in the second hierarchy level to calculate, with respect to a closed path in that hierarchy level, path delays at the positions of signal input/output terminals between that level and the first hierarchy level; (2) calculating the path delay target time of the closed path by proportional distribution of the path delays at the signal input/output terminals between that level and the first hierarchy level on the basis of the calculated path delays; and (3) outputting this calculated path delay target time.

According to the present invention, the path delays are calculated beforehand for the second hierarchy level of the electronic apparatus. Therefore, the present invention can utilize the information that cannot be obtained from the independently mounted components only of the first hierarchy level. In the present invention, information regarding the expected time at which the signal passes the signal input/output terminal which is the starting point or end point of a subdivided path in the first hierarchy level is provided, so that, for these subdivided paths too, the path delay target time to be obeyed in the physical hierarchy can be provided by subtracting the expected signal pass time at the starting point from that at the end point.

BRIEF DESCRIPTION OF THE DRAWINGS

FIG. 1 is a PAD diagram showing one form of a procedure of path delay allocation in the physical hierarchy in the present invention when a hierarchy level based for calculating the path delay is a module, and LSIs are mounted on another hierarchy level.

FIG. 3 illustrates specifications of input data used in the procedure of the path delay allocation in the physical hierarchy.

FIG. 4 illustrates specifications of output data used in the procedure of the path delay allocation in the physical hierarchy.

DESCRIPTION OF THE PREFERRED EMBODIMENT

Figure 2:
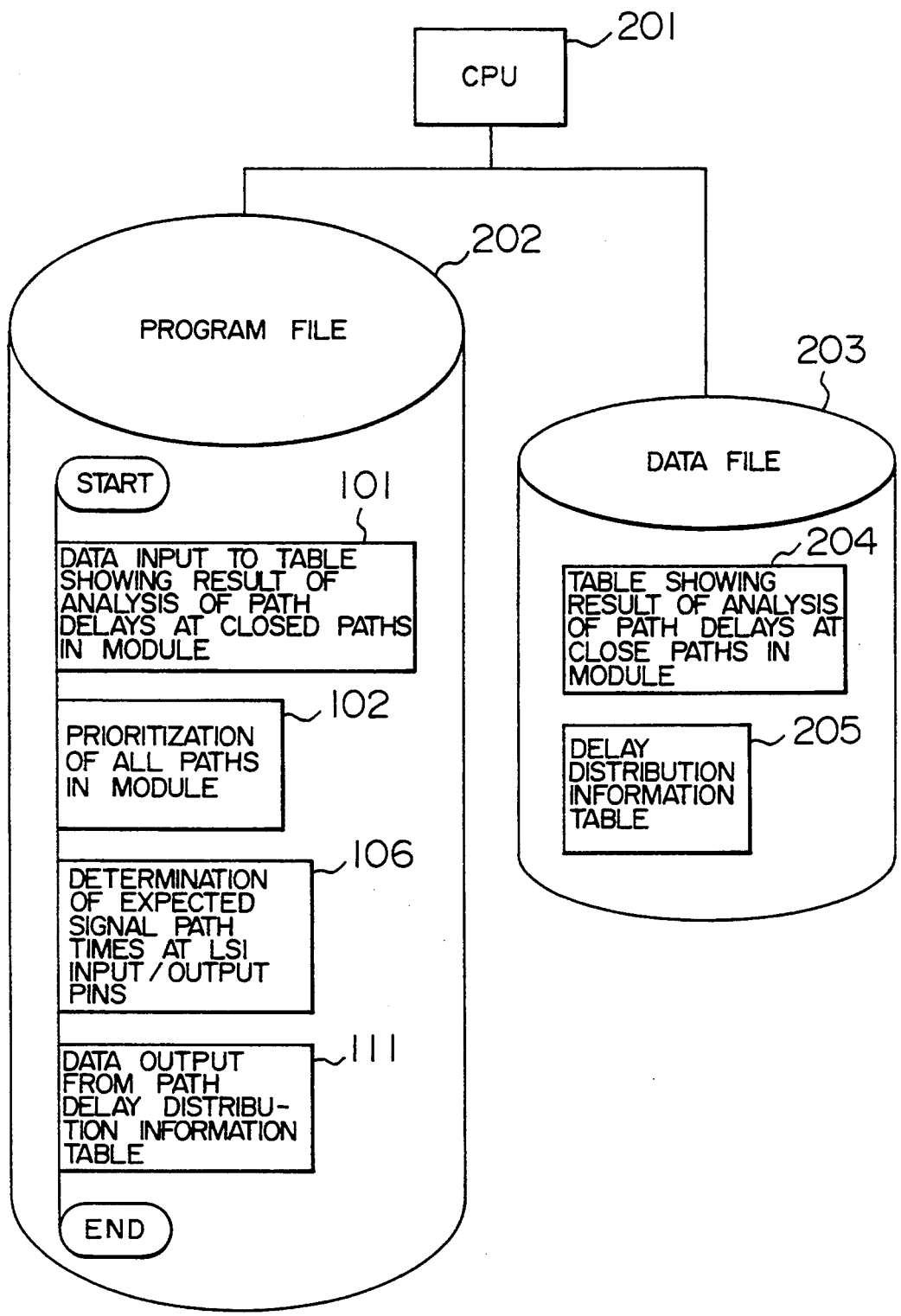
FIG. 2 shows the structure of a system used for the path delay allocation in the physical hierarchy.
Figure 5:
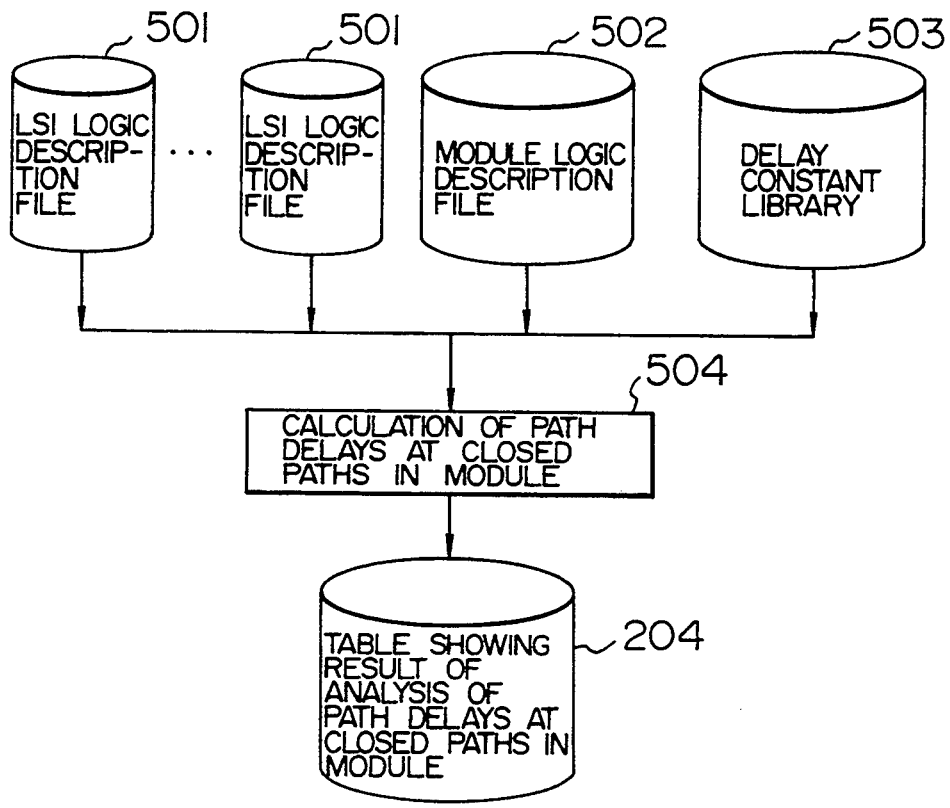
FIG. 5 illustrates how to produce the input data used in the procedure of the path delay allocation in the physical hierarchy.
Figure 6:
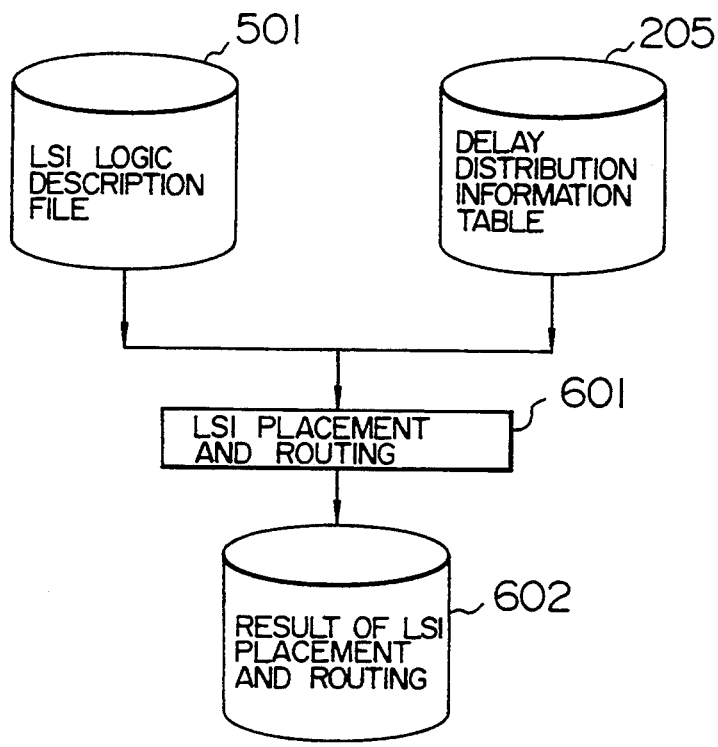
FIG. 6 illustrates a placement and routing procedure of LSIs by utilization of the resultant output of the system carrying out the procedure of the path delay allocation in the physical hierarchy.

In a preferred embodiment of the present invention which will be described now, it is supposed that a second hierarchy level based to calculate the path delay is a module, and LSIs are mounted on a first hierarchy level. FIG. 1 is a PAD diagram showing one form of a procedure of path delay allocation in the physical hierarchy. FIG. 2 shows the structure of a system used for executing the path delay allocation in the physical hierarchy. FIG. 5 shows how to prepare a table 204 showing the result of analysis of path delays at closed paths in the module to acquire input data used for the path delay allocation in the physical hierarchy. FIG. 6 schematically shows a placement and routing procedure of LSIs utilizing a path delay allocation information table 205 to acquire output data used for the path delay allocation in the physical hierarchy.

Figure 7:
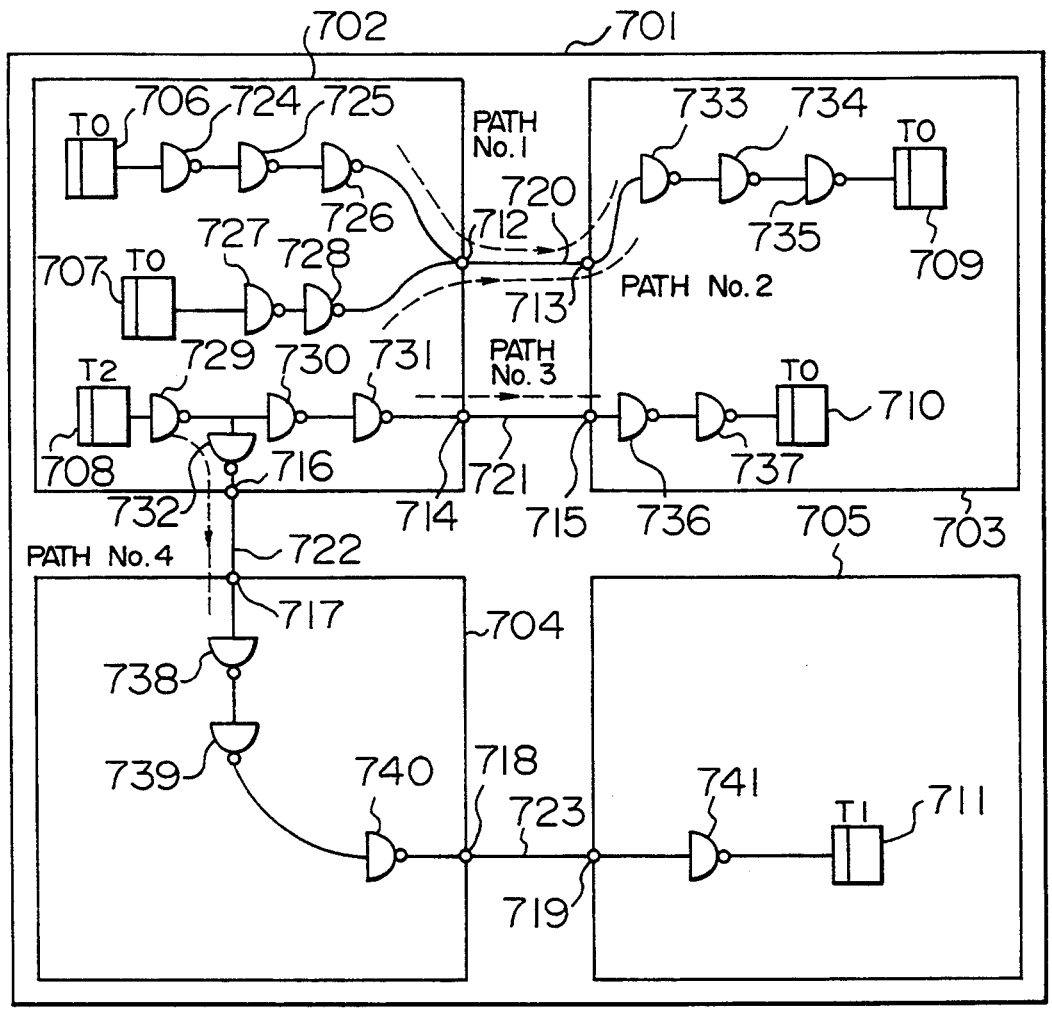
FIG. 7 shows the concept of a module, LSIs and paths extending between the LSIs on the module.

Paths extending between the hierarchy levels and LSIs mounted on the module will be described by reference to FIG. 7. FIG. 7 shows that LSIs 702 to 705 in the lower hierarchy level are mounted on a module 701 which is the upper hierarchy level. Also, FIG. 7 shows that there are a total of four paths extending between these hierarchy levels, that is, those starting from flip-flops 706 to 708 and ending at flip-flops 709 to 711 (paths starting from flip-flops in the LSIs and ending at flip-flops in other LSIs after passing through routes on the module). The upper hierarchy level consists of the module 701 and LSIs 702 to 705 which are in the lower hierarchy level and nets 720 to 723 which connect the LSIs. Signal input/output terminals 712 to 719 are located at the boundary between the module 701 in the upper hierarchy level and the LSIs 702 to 705 in the lower hierarchy level. In the LSIs 702 to 705, the flip-flops 706 to 711 are connected to logic gates 724 to 741 respectively as shown.

The first path (path No. 1) starts from the flip-flop 706 to end at the flip-flop 709 after sequentially extending through the gates 724 to 726, the output terminal 712, the net 720 and the gates 733 to 735. The second path (path No. 2) starts from the flip-flop 707 to end at the flip-flop 709 after sequentially extending through the gates 727, 728, the output terminal 712, the net 720, the input terminal 713 and the gates 733 to 735. The first and second paths have common pins 712 and 713. The third path (path No. 3) starts from the flip-flop 708 to end at the flip-flop 710 after sequentially extending through the gates 729 to 731, the output terminal 714, the net 721, the input terminal 715 and the gates 736, 737. The fourth path (path No. 4) starts from the flip-flop 708 to end at the flip-flop 711 after sequentially extending through the gates 729, 732, the output terminal 716, the net 722, the input terminal 717, the gates 738 to 740, the output terminal 718, the net 723, the input terminal 719 and the gate 741.

Within the extent of any one of the LSIs 702 to 705 in the lower hierarchy level, each of the four paths is not in the form of a closed path having the flip-flops at both of its starting and end points and is in the form of a subdivided path which is part of the closed path. The subdivided path having the flip-flop at its starting point is called an output open path, that having the flip-flop at its end point is called an input open path and that having no flip-flop at both of its starting and end points is called a through path.

The LSI 702 includes four output open paths. That is, there are: (1) a subdivided path starting from the flip-flop 706 to end at the output terminal 712 after extending through the gates 724 to 726; (2) a subdivided path starting from the flip-flop 707 to end at the output terminal 712 after extending through the gates 727 and 728; (3) a subdivided path starting from the flip-flop 708 to end at the output terminal 714 after extending through the gates 729 to 731; and (4) a subdivided path starting from the flip-flop 708 to end at the output terminal 716 after extending through the gates 729 and 732.

The LSI 703 includes two input open paths. That is, there are; (1) a subdivided path starting from the input terminal 713 to end at the flip-flop 709 after extending through the gates 733 to 735; and (2) a subdivided path starting from the input terminal 715 to end at the flip-flop 710 after extending through the gates 736 and 737.

The LSI 704 includes a through path starting from the input terminal 717 to end at the output terminal 718 after extending through the gates 738 to 740.

The LSI 705 includes an input open path starting from the input terminal 719 to end at the flip-flop 711 after extending through the gate 741.

Prior to the execution of the procedure of path delay allocation in the physical hierarchy, a step 504 shown in FIG. 5 for calculation of path delays at the closed paths in the module is carried out to prepare the table 204 showing the result of analysis of path delays at the closed paths in the module. As shown in FIG. 5, logic description files 501 of the individual LSIs mounted on the module, a logic description file 502 describing the connections between the individual LSIs and a path delay constant library 503 describing constants required for calculating the path delays are used as inputs so as to calculate the path delay at each of the closed paths in the module, and the result of calculation is outputted to the table 204 showing the result of analysis of path delays at the closed paths in the module. When the number of the closed paths on the module is very large, it is difficult as a matter of fact to calculate the path delays at all the closed paths on the module. Therefore, the step 504 of calculating the path delays at the closed paths on the module is executed in a manner as will be described now.

The closed paths closed in the LSIs located in the lower level relative to the level of the module are excepted from the subject of calculation of the path delays on the module. The remaining closed paths extending between the LSIs and the module are considered together with the combination of the flip-flop pairs located at the path starting and end points in the module. The path delays are calculated by the use of the critical path tracing algorithm, and the path (critical path) showing the greatest path delay among those having the same starting and end points is selected to represent the path delay. The result of calculation is stored in the table 204 showing the result of analysis of path delays at the closed paths in the module. FIG. 3 shows the data storage format in the path delay analysis result table 204.

As shown at 204a in FIG. 3, the starting flip-flops on the objective paths, the end flip-flops on those paths, the clock phases of the signals applied to the starting and end flip-flops, and the values of path delays are recorded on columns 301, 302, 303, 304 and 305 respectively in the path delay analysis result table 204. Also, not only the values of path delays at the objective paths, the values of path delays at the LSI input/output pins are also recorded. The number of the LSI input/output pins differs in each of the paths. Therefore, the LSI input/output pins on the paths and the values of path delays at those pins are also recorded on columns 308 and 309 respectively in a table 204b showing detailed path delays. Also, in the table 204a, entry to the table 204b of detailed path delays and the number of the LSI input/output pins on the paths are also recorded on columns 306 and 307 respectively.

Prior to the build-up of the physical hierarchy, the path delays are calculated by estimating the lengths of the routing between the flip-flops and the gates in the LSIs on the basis of logic information regarding the LSIs and module. After the build-up of the physical hierarchy, the path delays can be more accurately calculated by the use of the result 602 of placement and routing.

FIG. 2 shows the structure of a system used for the path delay allocation in the physical hierarchy. The system is composed of a program file 202 recording the procedure according to the present invention, a data file 203 storing input and output data during the procedure, and a central processing unit (CPU) 201 executing the procedure. In response to the application of input data from the module closed path delay analysis result table 204 in the data file 203, the CPU 201 calculates path delay allocation information according to steps 101 to 111 of the procedure of path delay allocation stored in the program file 202. The result of calculation of the path delay allocation information is supplied from the CPU 201 to the path delay allocation information table 205 in the data file 203. As shown in FIG. 4, the LSI input/output pins at which the critical paths pass on the module and the expected times at which the signal passes these pins are recorded on columns 401 and 402 respectively in this path delay allocation information table 205.

Referring to FIG. 6, in response to the application of input data from the LSI logic description file 501 and the path delay allocation information table 205, the placement and routing of the LSIs is executed in an LSI placement and routing step 601, and the result 602 of LSI placement and routing appears. In this case, the path delay target time for each closed path in the LSIs can be calculated on the basis of the clock phases at the starting and end points of the path. On the other hand, in the case of the open path and the through path, the path delay target time could not be calculated hitherto because the starting or end point is the LSI input/output pin. However, the target time for such a subdivided path can be calculated by the use of the expected signal pass time recorded on the column 402 in the path delay allocation information table 205. Thus, not only can the path delay target time be calculated for the closed path, but it can also be calculated for the open path and the through path. By executing the procedure of the LSI placement and routing step 601 while maintaining these target values, the result 602 of the LSI placement and routing procedure conforming to the target time requirement in the physical hierarchy can be obtained.

The outline of the procedure of path delay allocation in the physical hierarchy will now be described by reference to the PAD diagram shown in FIG. 1.

1) In the step 101, input data are recorded in the table 204 showing the result of analysis of path delays at the closed paths in the module. Then, in the steps 102 and 103, all the closed paths included in the closed path delay analysis result table 204 are prioritized. The step 103 is followed by the latch timing estimating step 104 in which, for all the paths stored in the module closed path delay analysis result table 204, the latch timing is estimated on the basis of the clock phases at the path starting and end points and the path delays recorded on the columns 303, 304 and 305 respectively. The step 103 is also followed by the path priority conclusion step 105 in which severity of each of the paths (the path delay value divided by the latch timing value) is calculated on the basis of the estimated values of latch timing and the path delays recorded on the column 305, so that all the closed paths are prioritized in the order of from the closed path having the greatest severity.

2) Then, in the step 106, the expected signal pass time at each LSI input/output pin through which the path extends is determined on the basis of the path delay analysis result table 204. In this case, the following procedures (1) to (3) are carried out in the step 107 for all the paths in the order of from the path having the highest priority determined already. In the procedure (1), the pin common to the LSI input/output pins determined already for the paths passing these pins and the LSI input/output pin at which the objective path passes is checked in the step 108. In the procedure (2), the objective path is segmented by this common pin in the step 109. In the procedure (3), the difference between the expected signal pass times at the starting and end points of the subdivided paths is calculated. This value and the path delays at the LSI input/output pins recorded on the column 309 in the table 204b are used for the proportional distribution of the calculated value between the LSI input/output pins, so that, in the step 110, the path delay target times at the LSI input/output pins of the subdivided paths to set the signal pass times can be allocated.

3) For all the LSI input/output pins at which the paths stored in the module path delay analysis result table 204 pass, the corresponding LSI input-/output pins and the calculated expected signal pass times at the pins recorded on the respective columns 401 and 402 in the table 204b are supplied to the path delay allocation information table 205 in the step 111.

Using a practical example of the logic circuit, the procedure of path delay allocation in the physical hierarchy will now be described in detail.

Figure 8:
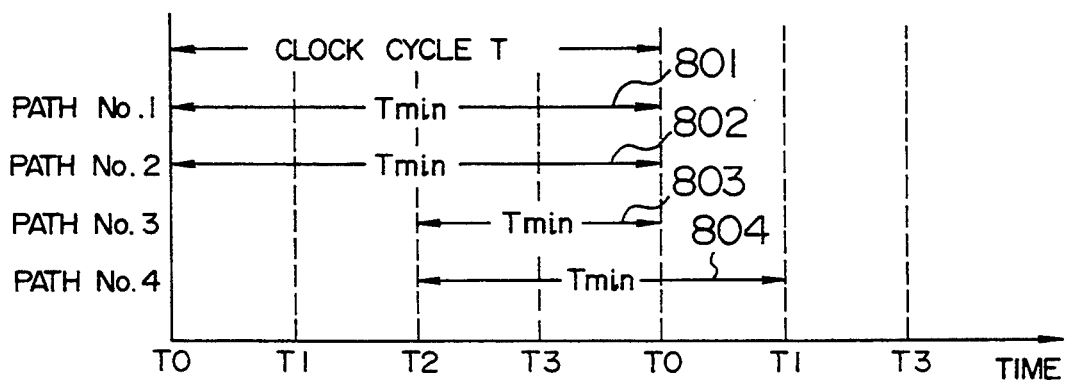
FIG. 8 illustrates how to estimate the latch timing.

First, the latch timing estimating step 104 will be described by reference to FIGS. 7 and 8.

A flip-flop in a synchronous logic circuit operates on the basis of a signal called a clock which is repeatedly turned on/off at a fixed time interval. The value stored in the flip-flop is outputted in synchronism with the clock signal, and the value of an input signal applied to the flip-flop is stored in synchronism with the clock signal. In the synchronous logic circuit, the signal outputted from a flip-flop located at the starting point of a path in synchronism with the clock signal must propagate through the path to reach an end flip-flop until he clock signal is applied again. Herein, the latch timing designates the period of time obtained by subtracting the time of appearance of the output signal of the starting flip-flop from the time at which the signal is stored in the end flip-flop.

Generally, as the clock signal, a plurality of kinds of signals which have the same frequency but have different phases are supplied. FIGS. 7 and 8 consider the case where a total of four kinds of clock signals having different phases are supplied. These clock signals are a basic clock signal T0, a clock signal T1 having its phase delayed by a ¼ clock cycle relative to the basic clock signal T0, a clock signal T2 having its phase delayed by a ½ clock cycle relative to the basic clock signal T0, and a clock signal T3 having its phase delayed by a ¾ clock cycle relative to the basic clock signal T0.

In the case of a closed path on the module, the clock phases only are provided for the starting and end flip-flops. Therefore, the latch timing tends to become ambiguous, and the amount of this ambiguity will become m times (m: an integer) as large as the clock cycle Tclock. The path No. 1 in FIG. 7 will be taken as an example. In the case of this path, its output signal propagates with the timing of the clock signal T0. However, whether the signal receiving timing at the end flip-flop is equal to the timing of the clock delayed by one clock cycle relative to the clock signal T0 or the timing of the clock delayed by two or more clock cycles relative to the clock signal T0 cannot be determined from the clock phase only, and an indefinite factor remains. According to this latch timing estimating step 104, the indefinite factor described above is removed so as to attain unique determination of the latch timing.

First, the minimum latch timing Tmin (>0) determined from the clock phases at the starting and end flip-flops on the path is calculated. This will be explained by reference to FIG. 8. In the case of paths Nos. 1 and 2 in FIG. 8, the clock phases at their starting and end points are the same as that of the clock signal T0, and the minimum latch timing Tmin is equal to the clock cycle Tclock as shown at 801 and 802. In the case of a path No. 3, its starting and end points are T2 and T0 respectively, and its Tmin is equal to (½) Tclock as shown at 803. In the case of a path No. 4, its starting and end points are T2 and T1 respectively, and its Tmin is equal to (¾) Tclock as shown at 804.

Then, each of the path delays recorded on the column 305 in the module closed path delay analysis result table 204 is designated as Td, and, on the basis of the values of Td and Tmin, the value of the minimum positive integer n satisfying the following expression (1) is calculated:

$$Td < Tmin + n \times Tclock + C \times Tclock \tag{1}$$

The value of n described above represents a deviation of the latch timing from Tmin, and its unit is the clock cycle. The constant C in the expression (1) is a margin provided because the value of the path delay before the complete build-up of the physical hierarchy does not necessarily fall within the extent of the latch timing, and the value of the constant C is usually selected to be 0.1 to 0.3. The latch timing Tlatch is calculated according to the following equation (2):

$$Tlatch = Tmin + n \times Tclock \tag{2}$$

The above description refers to the case where the values of the latch timing are not stored in both the LSI logic description file 501 and the module logic description file 502 and describes how to estimate the latch timing on the basis of the path delays recorded on the column 305 of the table 204. However, when a logic designer specifies intended values of the path latch timing, these values can be used instead of the above estimated values.

In the path priority calculating step 105, the ratio between the latch timing Tlatch calculated already and the corresponding path delay Td recorded on the column 305 of the table 204 is taken so as to calculate the severity S according to the following equation (3):

$$S \text{ (severity)} = Td/Tlatch \tag{3}$$

The fact that the value of this severity S is greater means that the path delay target time requirement imposed on that path is more severe. The path delay values stored in the module path delay analysis result table 204 for all the paths are sorted in the descending order of the severity.

The step 102 of prioritizing all the paths on the module is as described above. Now, the step 106 of determining the expected signal pass times at the LSI input-/output pins will be described.

Figure 9:
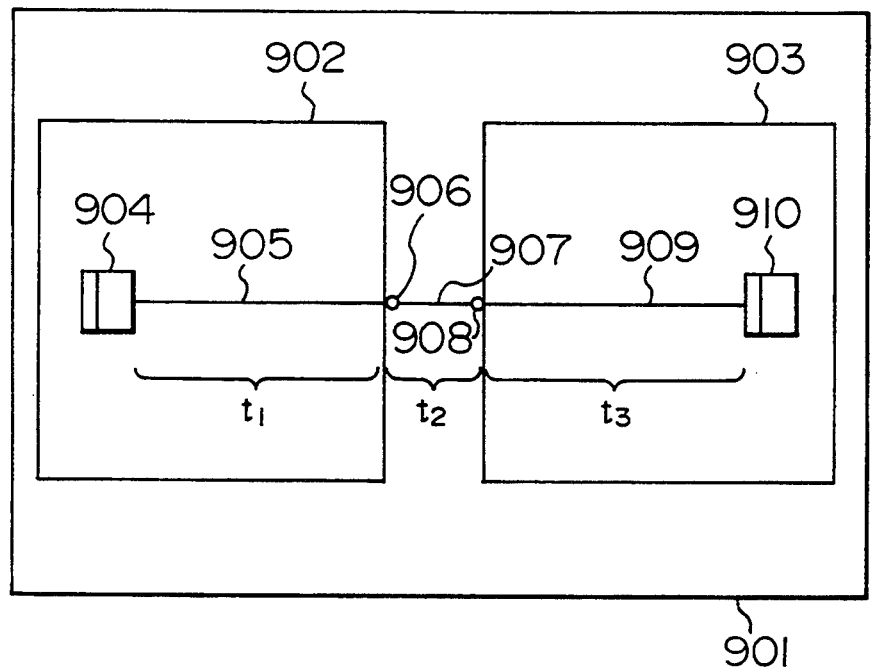
FIG. 9 shows a basic manner of determining the expected signal pass time.

First, how to determine the basic expected signal pass time will be described by reference to FIG. 9. FIG. 9 shows that LSIs 902 and 903 are mounted on a module 901, and one path extending from a starting flip-flop 904 is connected to an end flip-flop 910 after passing an LSI output open path 905, an output pin 906, a route 907 on the module, an input pin 908 of the LSI 903 and an LSI input open path 909 in the above order. (In FIG. 9, gates disposed midway of the path are not shown.)

By searching the column 308 in the module closed path delay analysis result table 204, the LSI input/output pin corresponding to the output pin 906 is detected. The path delay corresponding to that pin 906 is searched in the column 309, and this value is designated as a path delay t1 of the output open path 905 of the LSI 902. Similarly, the corresponding path delay value at the input pin 908 is searched in the column 309, and the value obtained by subtracting the value t1 from this value is designated as a path delay t2. This value t2 represents the period of time required for the signal to propagate through the route 907 on the module. Finally, the value obtained by subtracting the values t1 and t2 from the path delay searched in the column 305 is designated as a path delay t3 at the input open path 909 of the LSI 903.

The latch timing calculated in the latch timing estimating step 104 is designated as Tlatch, and the margin including clock skew, process fluctuation, etc. is designated as Tmargin. The true path delay target time to be obeyed with respect to the closed path in the module in the physical hierarchy is (Tlatch−Tmargin). When this period of time (Tlatch−Tmargin) is proportionally distributed using the values t1, t2 and t3, the path delay target times for the open paths 905 and 909 are calculated. Herein, the hierarchy level of the LSIs is the objective of the physical hierarchy, and the values t1 and t3 only are variable. The value t2 can be considered to be not variable. Therefore, as a result of the proportional distribution of the period of time (Tlatch−Tmargin), the path delay target time Tout for the output open path 905 is given by the following equation (4):

$$Tout = (Tlatch - Tmargin - t2) \cdot t1/(t1 + t3) \quad (4)$$

The path delay target time Tin for the input open path 909 is given by the following equation (5):

$$Tin = (Tlatch - Tmargin - t2) \cdot t3/(t1 + t3) \quad (5)$$

Then, using the values Tout and Tin, the expected signal pass times at the LSI pins are calculated on the basis of the rising time of the clock signal T0 rising at the time 0. Because the clock applied to the starting flip-flop 904 on this path is T0, the output signal appears from the flip-flop 904 at the time 0. Therefore, the expected time Tog at which the output signal passes the output pin 906 after passing the output open path 905 is given by the following equation (6):

$$Tog = (Tlatch - Tmargin - t2) \cdot t1/(t1 + t3) \quad (6)$$

The expected time Tig at which the signal passes the input pin 908 after propagating through the route on the module is given by the following equation (7):

$$Tig = (Tlatch - Tmargin - t2) \cdot t1/(t1 + t3) + t2 \quad (7)$$

In the embodiment described above, the path extending between two LSIs has been described by way of example. It is apparent however that the through path extending over three or more LSIs can be similarly dealt with.

The expected signal pass times at the LSI input/output pins can be basically determined according to the procedure described above. However, when a plurality of paths pass the LSI input/output pins of the same LSI, the expected signal pass times at those pins differ depending on the paths and cannot be uniquely determined. The path prioritizing on the basis of the severity is relied so as to obviate the contention between those paths. The steps 107 to 111 shown in FIG. 1 (that is, the steps following the step 106 of determining the expected signal pass times at the LSI input/output pins) are carried out for the purpose of obviating the path contention. These steps will now be described in the above order. For all the paths stored in the path delay analysis result table 204, the steps 108 to 111 are repeated after the step 107 in the order of from the path having the highest priority.

1) In the step 108, the LSI pins common to the paths are checked. That is, checking is made as to whether or not common pins exist between the LSI input/output pins included in the path which is the present objective and the LSI pins included in the path which has the priority higher than that of the objective path and which has been searched already. When there are the pins common to those pins, the expected signal pass times at the LSI input/output pins in the path having the higher priority are selected so as to avoid an undesirable contention between the paths.

2) In the path segmenting step 109, the i common pins found by the step 108 in the objective path are based to segment the path into (i+1) subdivided paths.

3) In the path delay allocation step 110, the path delay is allocated for each of the (i+1) subdivided paths. That is, when the common pin exists at the path starting or end point, the expected signal pass time determined already is preferentially used, and the unknown expected signal pass time at the pin intermediate between the path starting and end points is determined according to the method described already by reference to FIG. 9.

Figure 10:
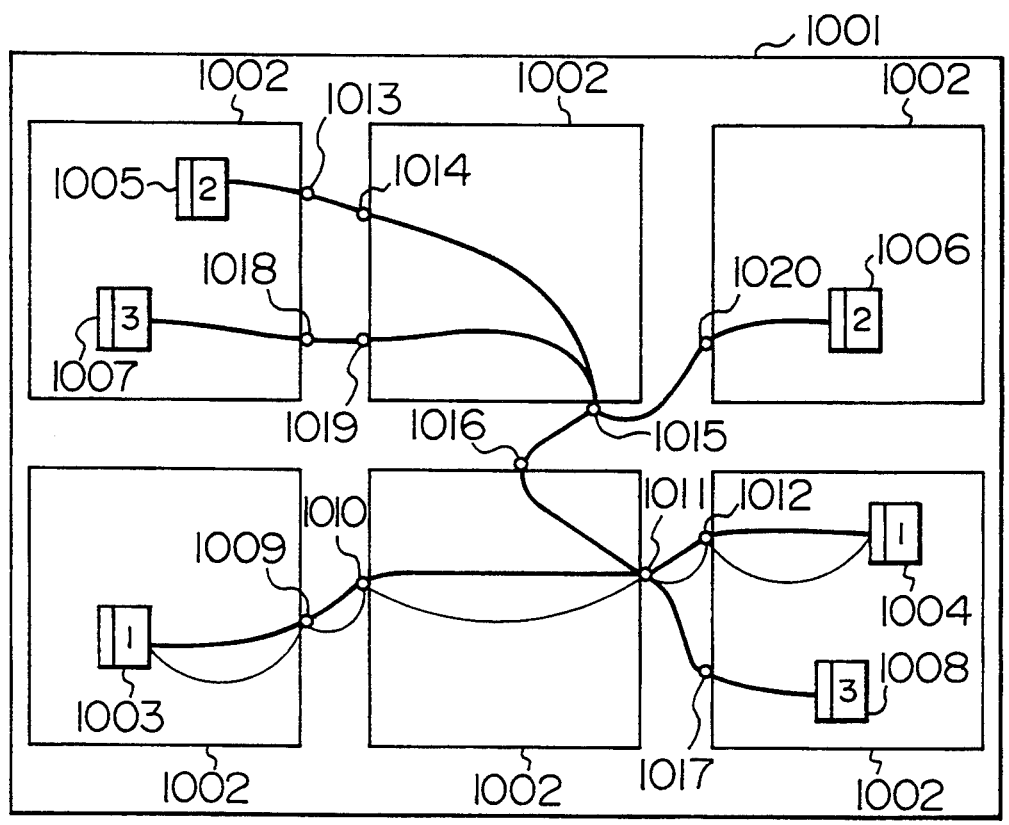
FIG. 10 shows a practical example for explaining how to resolve conflicts between a plurality of paths (three paths) having common pins so as to determine the expected signal pass times at those pins and illustrates the case of a path No. 1.
Figure 11:
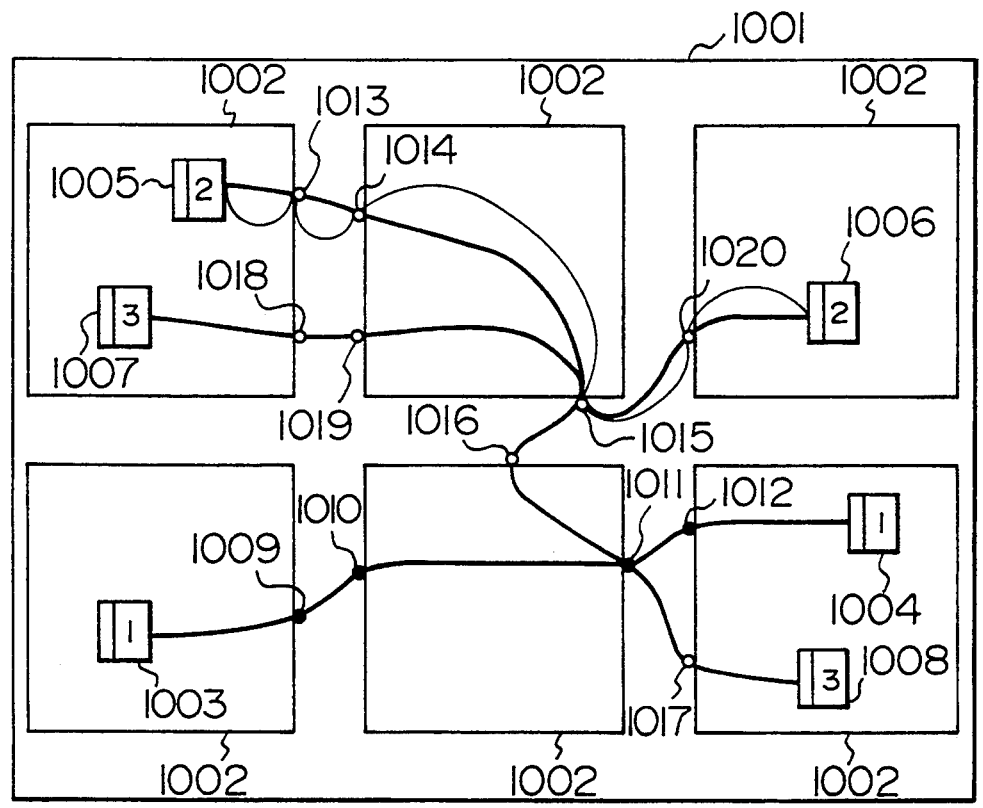
FIG. 11 is a view similar to FIG. 10 except that it illustrates the case of a path No. 2.
Figure 12:
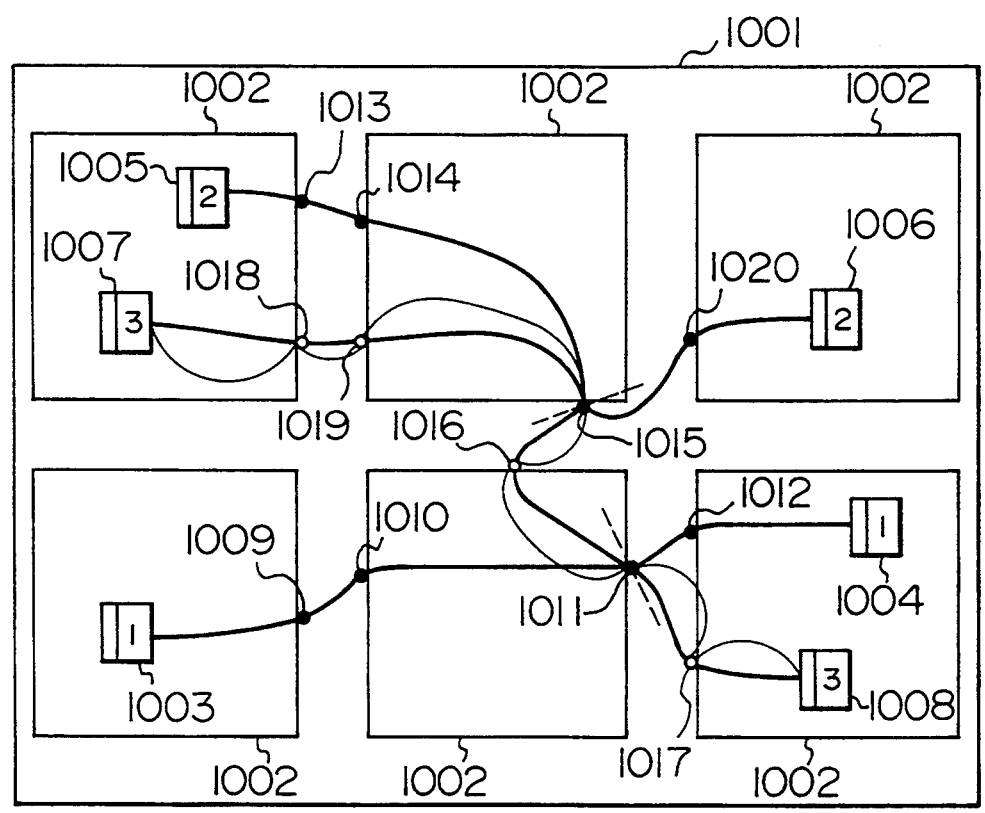
FIG. 12 is a view similar to FIG. 10 except that it illustrates the case of a path No. 3 which is segmented into three subdivided paths.

Now, practical examples shown in FIGS. 10 to 12 are used to describe in detail the step 106 of determining the expected signal pass times at the LSI input/output pins. FIGS. 10 to 12 show that closed paths in the physical hierarchy extend between six LSIs 1002 mounted on a module 1001 to pass LSI input/output pins. (Except flip-flops 1003 to 1008, gates disposed in the LSIs are not shown.) The expected signal pass times at LSI input/output pins 1009 to 1020 are determined according to the procedure which will be described now. In FIGS. 10 to 12, black dots ● indicate the pins whose expected signal pass times have been determined already, while white dots ○ indicate the pins whose expected signal pass times have not been determined yet.

It is supposed that the result of the step 102 of prioritizing all the paths on the module proves that the following three paths have high priority among all the paths on the module 1001:

1) The path No. 1 which starts from the flip-flop 1003 and passes the pins 1009, 1010, 1011 and 1012 in the above order to end at the flip-flop 1004.
2) The path No. 2 which starts from the flip-flop 1005 and passes the pins 1013, 1014, 1015 and 1020 in the above order to end at the flip-flop 1006.
3) The path No. 3 which starts from the flip-flop 1007 and passes the pins 1018, 1019, 1015, 1016, 1011 and 1017 in the above order to end at the flip-flop 1008.

First, referring to FIG. 10, the steps 108 to 110 are executed for the path No. 1 which has the highest priority among the three paths in the mode shown in FIG. 10. Because the priority of the other two paths is lower than that of the path No. 1, the steps 108 and 109 are not practically executed. Therefore, the expected signal pass times at the pins 1009 to 1012 are determined by the step 110 executing the procedure described already by reference to FIG. 9.

Then, the mode shown in FIG. 10 shifts to that shown in FIG. 11, and the procedure similar to that executed for the path No. 1 is now executed for the path No. 2. In the step 108, pins common to those on the path No. 1 are checked. Because the path No. 2 does not include pins common to those on the path No. 1, the step 109 of path segmentation is not carried out, and the step 110 is executed to determine the expected signal pass times at the pins 1013, 1014, 1015 and 1020.

Then, the mode shifts to that shown in FIG. 12, and the procedure similar to that executed for the path No. 1 is now executed for the path No. 3. In the step 108, the pin 1011 common to both the paths Nos. 1 and 3 is found, and the pin 1015 common to both the paths Nos. 2 and 3 is found. In the step 109, the path No. 3 is segmented by these pins 1011 and 1015 into three subdivided paths. As a result, the path No. 3 is segmented into the following three subdivided paths:

1) The subdivided path No. 1 which starts from the flip-flop 1007 and passes the pins 1018 and 1019 to end at the pin 1015.
2) The subdivided path No. 2 which starts from the pin 1015 and passes the pin 1016 to end at the common pin 1011.
3) The subdivided path No. 3 which starts from the common pin 1011 and passes the pin 1017 to end at the flip-flop 1008.

In the step 110, the path delay allocation procedure described by reference to FIG. 9 is executed. For the subdivided path No. 1, the expected signal pass times at the pins 1018 and 1019 are determined. In this case, the value of Tmargin used in the calculation is Tmargin=0 because the end point of this subdivided path No. 1 is not the flip-flop. For the subdivided path No. 2, the expected signal pass time at the pin 1016 is similarly determined. For the determination of the latch timing, the expected signal pass times at the pins 1015 and 1016 determined for the subdivided paths Nos. 1 and 2 are used instead of the clock cycle. Finally, the step 110 is executed for the subdivided path No. 3 to determine the expected signal pass time at the pin 1017.

The above steps determine the expected signal pass times for all the LSI input/output pins stored in the table 204 showing the result of analysis of path delays at the closed paths on the module.

It will be understood from the foregoing detailed description of the present invention that, in an electronic apparatus of hierarchical design including paths extending between a plurality of hierarchy levels, the path delay target time can be determined for each of the subdivided paths in the physical hierarchy. Therefore, the path delay less than the path delay target time can be provided not only for each of the closed paths but also for each of the open paths and through paths in the physical hierarchy, so that the path delay at each of those paths in the entire apparatus can be limited to less than the target time.

Further, the present invention is not intended for attaining the sole purpose of eliminating the undesirable path delay violation in which the path delay exceeds its target time. According to the present invention, for a gate on any one of paths having a slack for path delay relative to the target time, the power consumption of the gate is minimized at the sacrifice of the operating speed of the gate, so that the power consumption of the entire apparatus of hierarchical design can be minimized.

We claim:

1. In an electronic apparatus having a physical hierarchical structure including at least a first hierarchy level comprising a plurality of electronic components, and a second hierarchy level where a plurality of the first hierarchy levels are mounted such that input and output terminals of said electronic components of said first hierarchy levels are connected to each other, said electronic components including a plurality of flip-flop circuits wherein input/output operation of logical signals at said plurality of flip-flop circuits is controlled in accordance with clock signals, a plurality of signal paths for transmitting logical signals between said plurality of flip-flop circuits in different electronic components, a path delay allocation method in said physical hierarchical structure comprising the steps of:

1) calculating path delay times at said second hierarchy level for said plurality of signal paths extending over said first hierarchy level and said second hierarchy level;
2) calculating a path delay target time, on the basis of a result of calculation in said step 1), for a subdivided path of a first signal path of said plurality of signal paths belonging to said first hierarchy level, said first signal path extending over said first hierarchy level and said second hierarchy level; and
3) outputting a result of the calculating the path delay target time in said step 2) in a form such that said result is utilized when said electronic components are positioned in said first hierarchy level, so that the path delay time of the first signal path extending over said first and second hierarchy levels is allocated to a part of the first signal path belonging to said first hierarchy level.

2. A path delay allocation method in the physical hierarchical structure according to claim 1, wherein, in the step of outputting the calculated path delay target times, expected times at which the signal passes the input/output terminals of said first hierarchy level are outputted as the path delay target times.

3. A path delay allocation method in the physical hierarchical structure according to claim 2, wherein the calculating of the path delay target times for said subdivided paths includes:

2A) prioritizing closed paths on said second hierarchy level on the basis of a slack for the calculated path delays relative to target times of said closed paths; and
2B) for all the paths starting from a path having the highest priority;
  a) searching for common signal input/output terminals of said first hierarchy level, said common signal input/output terminals being terminals which the presently objective path passes through and the paths having a priority higher than that of the presently objective path pass through;
  b) segmenting the presently objective path by said common signal input/output terminals into subdivided paths;
  c) for each of said subdivided paths, proportionally distributing the difference between the expected signal pass target times at the starting and end points of said subdivided path according to the calculated path delays at the signal input/output terminals to calculate the expected signal pass times at the signal input/output terminals of said subdivided path; and
  d) repeating the step 2B).

4. A path delay allocation method according to claim 1, wherein in said step 2), a signal pass target time at a terminal in the subdivided path is calculated by a difference between target times when the logical signal passes through an initial point and an end point of said subdivided path is allocated to each of said terminals in accordance with a delay value of the terminal of the path delay calculation result.

5. In an electronic apparatus of hierarchical structure comprising a first hierarchy level having a plurality of electronic components and a second hierarchy level where the plurality of electronic components on said first hierarchy level are mounted, signal input/output terminals of said first hierarchy level being connected to each other on said second hierarchy level, a path delay allocation method in the physical hierarchy comprising the steps of:

pre-calculating path delays at said second hierarchy level;

calculating, for a path extending between said first hierarchy level and said second hierarchy level, a path delay target time for each of a plurality of subdivided paths of said path on said first hierarchy level in accordance with the result of the calculation of the path delays, the calculating of the path delay target times for said subdivided paths includes:

1) prioritizing closed paths on said second hierarchy level on the basis of a slack for the calculated path delays relative to target times of said closed paths; and 2) for all the paths starting from a path having the highest priority;

a) searching for common signal input/output terminals of said first hierarchy level, said common signal input/output terminals being terminals which the presently objective path passes through and the paths having a priority higher than that of the presently objective path pass through;

b) segmenting the presently objective path by said common signal input/output terminals into subdivided paths;

c) for each of said subdivided paths, proportionally distributing the difference between the expected signal pass target times at the starting and end points of said subdivided path according to the calculated path delays at the signal input/output terminals to calculate the expected signal pass times at the signal input/output terminals of said subdivided path; and d) repeating the step 2); and outputting the calculated path delay target times in a form that is utilized when said first hierarchy level is constructed with the plurality of electronic components, wherein an expected time at which the signal passes the input/output terminals of said first hierarchy level are outputted as the path delay target times.

* * * * *